Patented Feb. 18, 1947

2,415,827

UNITED STATES PATENT OFFICE 2,415,827

PRINTING INK

Ernest D. Lee, West Englewood, N. J., assignor to Interchemical Corporation, New York, N. Y., a corporation of Ohio No Drawing. Application July 9, 1945, Serial No. 604,101

3 Claims. (Cl. 106—31)

This invention relates to printing inks which have the characteristic of being set by moisture, and is particularly intended to provide an inexpensive ink of this general character, characterized by good printing properties and excellent press-stability.

The setting of inks by the application of moisture as a precipitant, disclosed in the Gessler U. S. Patent No. 2,157,385, of May 9, 1939, has resulted in considerable research being undertaken to provide inks which give satisfactory printing at the higher humidities encountered in press rooms, combined with press stability, and rapid setting when exposed to moisture, whether in the liquid or vapor phase. Very few materials have been found which produce desirable inks. In general, the solvents have been restricted to the polyglycols and the polyether alcohols; the number of available resins is limited to a very few sharply defined classes, all of which are considerably more expensive than the resins commonly used in printing ink. Furthermore, all of the resins still leave something to be desired in the way of printability. As a result of these drawbacks, only a limited field of printing has been available to these moisture setting inks; they have not been able to compete in the large fields of publication and newsprinting, where low cost and good printing properties are essential elements.

I have discovered that beta naphthol pitch, when dissolved in a water-soluble solvent of the class consisting of the polyglycols and the polyglycol monoethers, makes an excellent and inexpensive vehicle for moisture-setting inks.

Beta naphthol pitches are still-bottoms obtained in the production of beta naphthol, when the pure product is distilled from the crude naphthol, obtained by the fusion of naphthol sulfonic acid with alkali hydroxide, followed by separation of the crude from the reaction mixture. Until my discovery, they have had no technical utility, being burned as waste.

Typical examples of my invention are the following:

Example 1A.—Varnish (1 poise viscosity)

| | Pounds |
|---|---|
| B-naphthol pitch | 20 |
| Diethylene glycol | 50 |
| | 70 |

Example 1B.—News ink

| | Pounds |
|---|---|
| Carbon black | 12 |
| Varnish of Example 1A | 88 |
| | 100 |

This is a smooth running news ink which is stable on the press, and sets rapidly with moisture.

Example 2A.—Varnish (18 poise viscosity)

| | Pounds |
|---|---|
| B-naphthol pitch | 50 |
| Diethylene glycol | 50 |
| | 100 |

Example 2B.—Rotary black ink

| | Pounds |
|---|---|
| Carbon black | 22 |
| Varnish of Example 2A | 78 |

This is heavier bodied than the ink of Example 1, and can be used on rotary presses.

Example 3.—Rotary black

| | Pounds |
|---|---|
| Naphthol pitch | 27.0 |
| Terpene phenol resin | .3 |
| Carbon black | 16.7 |
| Talc | 2.8 |
| Petrolatum | 2.0 |
| Paraffin wax | .7 |
| Prussian blue | 4.0 |
| Alkali blue | .3 |
| Dipropylene glycol | 45.0 |

This is a toned black, which gives excellent printing.

Example 4.—Rotary black

| | Pounds |
|---|---|
| Beta naphthol pitch | 30.0 |
| Crude diethylene glycol | 49.2 |
| Water | 7.9 |
| Carbon black | 12.7 |
| Induline toner | .2 |

This ink, while it contains almost 8% of water, still yields excellent prints.

Example 5.—Rotary black

| | Pounds |
|---|---|
| Beta naphthol pitch | 25.2 |
| Maleated rosin | 3.0 |
| Carbon black | 12.6 |
| Talc | 2.6 |
| Petrolatum | 2.0 |
| Paraffin wax | 0.9 |
| Prussian blue | 2.6 |
| Dipropylene glycol | 49.2 |
| Alkali blue pulp | 2.4 |

This is a more highly toned ink than that of Example 3.

Obviously, examples can be multiplied indefinitely without departing from the scope of the invention, which is defined in the claims. In particular, other pigments can be substituted for the pigments shown, although the pitch is of such a dark color that no light color can be obtained. As indicated in the examples, small percentages of other resins can be employed, provided they are soluble in the solvents chosen. Furthermore, other water-soluble poly-glycols can be substituted for the polyglycols shown, and so can their water-soluble monoethers. As can be seen by reference to Example 4, the pitch solutions will tolerate small percentages of water without precipitation. The addition of these small percentages of water serves both to reduce the cost and to insure more rapid water-setting of the ink.

I claim:

1. A typographic printing ink characterized by its ability to be set by the application of water to the film which comprises pigment dispersed in the vehicle the major binder component of which is beta naphthol pitch, dissolved in the liquid water-soluble solvent of the group consisting of polyglycols and polyglycols monoethers.

2. A typographic printing ink characterized by its ability to be set by the application of water to the film which comprises pigment dispersed in the vehicle the major binder component of which is beta naphthol pitch, dissolved in diethylene glycol.

3. A typographic printing ink characterized by its ability to be set by the application of water to the film which comprises pigment dispersed in the vehicle the major binder component of which is beta naphthol pitch, dissolved in dipropylene glycol.

ERNEST D. LEE.